(12) United States Patent
Kwon et al.

(10) Patent No.: US 10,411,247 B2
(45) Date of Patent: Sep. 10, 2019

(54) FABRICATION METHOD OF ELECTRODE FOR ALL SOLID CELL

(71) Applicants: Hyundai Motor Company, Seoul (KR); Kia Motors Corporation, Seoul (KR); IUCF-HYU (Industry-University Cooperation Foundation Hanyang University), Seoul (KR)

(72) Inventors: Oh Min Kwon, Busan (KR); Yong Sub Yoon, Soeul (KR); Sung Woo Noh, Seoul (KR); Sun Ho Choi, Incheon (KR); Jin Oh Son, Gyeonggi-do (KR); Dong Wook Shin, Gyeonggi-do (KR); Chan Hwi Park, Seoul (KR)

(73) Assignees: Hyundai Motor Company, Seoul (KR); Kia Motors Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 94 days.

(21) Appl. No.: 15/844,934

(22) Filed: Dec. 18, 2017

(65) Prior Publication Data
US 2019/0115582 A1    Apr. 18, 2019

(30) Foreign Application Priority Data
Oct. 13, 2017   (KR) .......................... 10-2017-0133333

(51) Int. Cl.
*C01B 17/00*    (2006.01)
*H01M 4/04*    (2006.01)
(Continued)

(52) U.S. Cl.
CPC .......... *H01M 4/0409* (2013.01); *C01B 17/00* (2013.01); *H01M 4/0404* (2013.01);
(Continued)

(58) Field of Classification Search
CPC ...................................................... C01B 17/00
See application file for complete search history.

(56) References Cited

U.S. PATENT DOCUMENTS

2014/0057180 A1* 2/2014 Iwasaki ............... H01M 4/366
   429/304
2016/0315324 A1* 10/2016 Miki ....................... H01M 4/62

FOREIGN PATENT DOCUMENTS

KR   10-2015-0018562   2/2015
WO      2013/073214 A1   5/2013

* cited by examiner

*Primary Examiner* — David P Turocy
*Assistant Examiner* — Mohammad Mayy
(74) *Attorney, Agent, or Firm* — Mintz Levin Cohn Ferris Glovsky and Popeo, P.C.; Peter F. Corless

(57) ABSTRACT

A fabrication method of an electrode for an all solid cell includes: providing a sulfide-based solid electrolyte; forming a coating layer on a surface of the sulfide-based solid electrolyte by heating a nonmetallic oxide at 300 to 700° C.; forming electrode slurry by mixing an electrode active material, the sulfide-based solid electrolyte formed with the coating layer, and a conductive material with a polar solvent; casting the electrode slurry on at least one surface of an electrode current collector; removing the polar solvent by heating the cast electrode slurry at 100 to 300° C.; and removing the coating layer by heating the electrode slurry from which the polar solvent is removed at 300 to 700° C.

8 Claims, 6 Drawing Sheets

(51) Int. Cl.
*H01M 4/62* (2006.01)
*H01M 4/525* (2010.01)

(52) U.S. Cl.
CPC ......... *H01M 4/0471* (2013.01); *H01M 4/525* (2013.01); *H01M 4/625* (2013.01)

ABRICATION METHOD OF ELECTRODE FOR ALL SOLID CELL

CROSS-REFERENCE TO RELATED APPLICATION

This application claims under 35 U.S.C. § 119(a) the benefit of Korean Patent Application No. 10-2017-0133333 filed Oct. 13, 2017, the entire contents of which are incorporated herein by reference.

BACKGROUND

(a) Technical Field

The present disclosure relates to a fabrication method of an electrode for an all solid cell, more particularly, to a fabrication method of an electrode capable of securing chemical stability of a sulfide-based solid electrolyte and fabricating an electrode while maintaining ion conductivity of the sulfide-based solid electrolyte.

(b) Description of the Related Art

A sulfide-based solid electrolyte used for an all solid cell has reactivity with a polar solvent, and thus, there is a problem in that a side reaction occurs when the sulfide-based solid electrolyte is introduced into the polar solvent. Accordingly, there is a problem in that the sulfide-based solid electrolyte and the polar solvent cannot be used at the same time when fabricating electrode slurry, and a non-polar solvent that is not reactive with the solid electrolyte deteriorates the dispersibility of the sulfide-based solid electrolyte. An extreme non-polar solvent which cannot be used in the fabrication of slurry and is not reactive with the solid electrolyte has a disadvantage in that the dispersibility of the sulfide-based solid electrolytes is very poor.

In order to improve the dispersibility, a dispersant having an organic component may be added, but organic materials activated during a drying process react with the sulfide-based solid electrolyte, and thus, there is a high possibility to deteriorate the properties of the solid electrolyte.

In Japanese Patent Laid-Open Publication No. 2012-061258, there is disclosed a method of coating a solid electrolyte on the surface of an electrode active material, but a method of coating an oxide on the surface of a solid electrolyte is not disclosed. In Korean Patent Publication No. 10-2015-0018562, there is disclosed a structure in which a conductive material and a coating layer are formed on the surface of an electrode active material. However, there is no disclosure of directly forming a coating layer on a solid electrolyte to inhibit the reaction with a polar solvent, removing a polar solvent, and then removing the coating layer.

The above information disclosed in this Background section is only for enhancement of understanding of the background of the disclosure and therefore it may contain information that does not form the prior art that is already known in this country to a person of ordinary skill in the art.

SUMMARY

An object of the present disclosure is to provide a fabrication method of an electrode for an all solid cell capable of securing chemical stability of a sulfide-based electrolyte and fabricating an electrode for the all solid cell while maintaining ion conductivity of the sulfide-based solid electrolyte.

Another object of the present disclosure is to provide a fabrication method of an electrode for an all solid cell capable of securing stability of electrode slurry itself by using a polar solvent having high dispersibility.

In one aspect, the present disclosure provides a fabrication method of an electrode for an all solid cell including: providing a sulfide-based solid electrolyte; forming a coating layer on a surface of the sulfide-based solid electrolyte by heating a nonmetallic oxide at 300 to 700° C.; forming electrode slurry by mixing an electrode active material, the sulfide-based solid electrolyte formed with the coating layer, and a conductive material with a polar solvent; casting the electrode slurry on at least one surface of an electrode current collector; removing the polar solvent by heating the cast electrode slurry at 100 to 300° C.; and removing the coating layer by heating the electrode slurry from which the polar solvent is removed at 300 to 700° C.

In a preferred embodiment, in the forming of the coating layer, the nonmetallic oxide my have a boiling point of 300° C. to 700° C.

In another preferred embodiment, the nonmetallic oxide may be at least one of $H_3BO_3$ or $P_2O_5$.

In still another preferred embodiment, the forming of the coating layer may be performed in an inert gas atmosphere.

In yet another preferred embodiment, in the forming of the electrode slurry, the polar solvent may include at least one of isopropanol, acetonitrile, and acetone.

In still yet another preferred embodiment, in the forming of the electrode slurry, the electrode active material may include at least one of lithium cobalt oxide, lithium iron phosphate, nickel cobalt aluminum, and nickel cobalt manganese.

In a further preferred embodiment, in the forming of the electrode slurry, the conductive material may include at least one of graphite, a spherical carbon material, and a needle-like carbon material.

In another further preferred embodiment, in the casting of the electrode slurry, the electrode current collector may include at least one of aluminum, nickel, and steel use stainless.

According to the fabrication method of the electrode for the all solid cell according to the embodiment of the present disclosure, it is possible to secure chemical stability of a sulfide-based solid electrolyte and fabricate an electrode for the all solid cell while maintaining ion conductivity of the sulfide-based solid electrolyte. Further, it is possible to secure stability of electrode slurry itself by using a polar solvent having high dispersibility.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
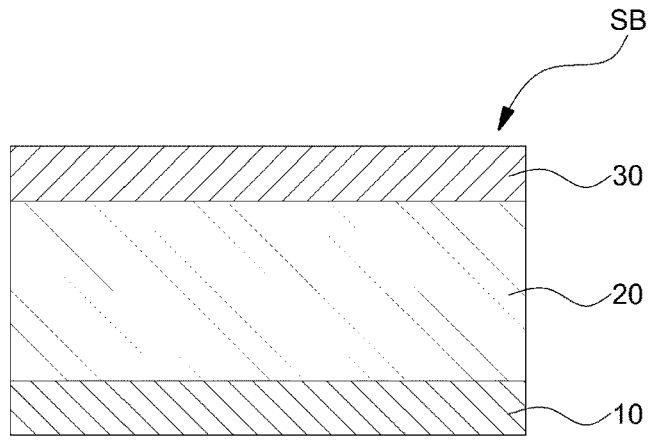
FIG. 1 is schematic cross-sectional view of an all solid cell including an electrode fabricated by a fabrication method of a sulfide-based solid electrolyte for the electrode of the all solid cell according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In the description of each drawing, like reference numerals are used for like constitute elements. In the accompanying drawings, dimensions of structures are illustrated to be more enlarged than actual dimensions for clarity of the present invention. Terms such as first, second, and the like may be used to describe various components and the components should not be limited by the terms. The terms are used to only distinguish one component from another component. For example, a first component may be referred to as a second component, and similarly, the second component may be referred to as the first component without departing from the scope of the present invention. Singular expressions used herein include plurals expressions unless they have definitely opposite meanings in this context.

FIG. 1 is a schematic cross-sectional view of an all solid cell according to an embodiment of the present disclosure.

Referring to FIG. 1, an all solid cell SB according to an embodiment of the present disclosure includes a cathode 10, a sulfide-based solid electrolyte layer 20, and an anode 30. At least one of the cathode 10 and the anode 30 may be fabricated by the fabrication method of the electrode for the all solid cell according to the embodiment of the present disclosure to be described below.

For example, when the cathode 10 is fabricated by the fabrication method of the electrode for the all solid cell according to the embodiment of the present disclosure, the cathode 10 may include a cathode active material, a sulfide-based solid electrolyte, a conductive material, and a cathode current collector. The cathode active material may include, for example, at least one of lithium cobalt oxide, lithium iron phosphate, nickel cobalt aluminum, and nickel cobalt manganese. The sulfide-based solid electrolyte may be a sulfide-based solid electrolyte. The sulfide-based solid electrolyte may refer to a sulfide-based solid electrolyte including sulfide. The conductive material may include at least one of, for example, graphite, a spherical carbon material (super-P and the like), a needle-like carbon material (vapor grown carbon fiber, VGCF), carbon nanofiber (CNF), and the like.

The cathode active material, the sulfide-based solid electrolyte, and the conductive material may be provided on at least one surface of the cathode current collector. The cathode active material, the sulfide-based solid electrolyte, and the conductive material may be randomly arranged. The cathode current collector may include at least one of aluminum, nickel, and steel use stainless (SUS).

The sulfide-based solid electrolyte layer 20 is provided between the cathode 10 and the anode 30. The sulfide-based solid electrolyte layer 20 may include, for example, a sulfide-based solid electrolyte.

The anode 30 faces the cathode 10. For example, when the anode 30 is fabricated by the fabrication method of the electrode for the all solid cell according to the embodiment of the present disclosure, the anode 30 may include an anode active material, a sulfide-based solid electrolyte, a conductive material, and an anode current collector. The anode active material may include, for example, at least one of lithium cobalt oxide, lithium iron phosphate, nickel cobalt aluminum, and nickel cobalt manganese. The sulfide-based solid electrolyte may be a sulfide-based solid electrolyte. The sulfide-based solid electrolyte may refer to a sulfide-based solid electrolyte including sulfide. The conductive material may include at least one of, for example, graphite, a spherical carbon material (super-P and the like), a needle-like carbon material (vapor grown carbon fiber, VGCF), carbon nanofiber (CNF), and the like.

The anode active material, the sulfide-based solid electrolyte, and the conductive material may be provided on at least one surface of the anode current collector. The anode active material, the sulfide-based solid electrolyte, and the conductive material may be randomly arranged. The anode current collector may include at least one of aluminum, nickel, and steel use stainless (SUS).

Figure 2A:
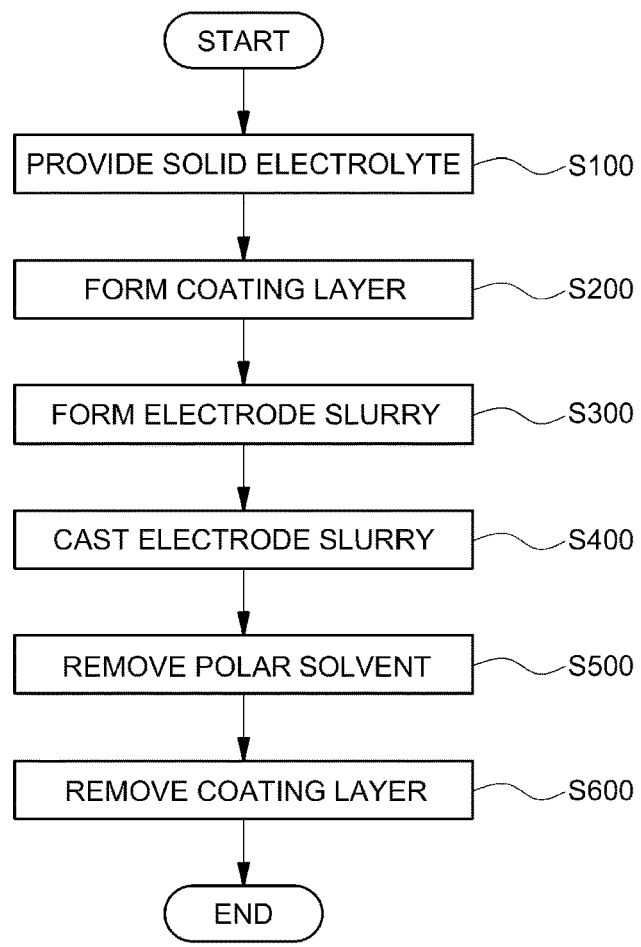
FIG. 2A is a flowchart schematically illustrating a fabrication method of an electrode for an all solid cell according to an embodiment of the present disclosure.

FIG. 2A is a flowchart schematically illustrating a fabrication method of an electrode for an all solid cell according to an embodiment of the present disclosure.

Referring to FIG. 2A, a fabrication method of an electrode for an all solid cell according to an embodiment of the present disclosure includes providing a sulfide-based solid electrolyte (S100), forming a coating layer on a surface of the sulfide-based solid electrolyte by heating a nonmetallic oxide at 300 to 700° C. (S200), forming electrode slurry by mixing an electrode active material, the sulfide-based solid electrolyte formed with the coating layer, and a conductive material with a polar solvent (S300), casting the electrode slurry on at least one surface of an electrode current collector (S400), removing the polar solvent by heating the cast electrode slurry at 100 to 300° C. (S500), and removing the coating layer by heating the electrode slurry from which the polar solvent is removed at 300 to 700° C. (S600).

Figure 2B:
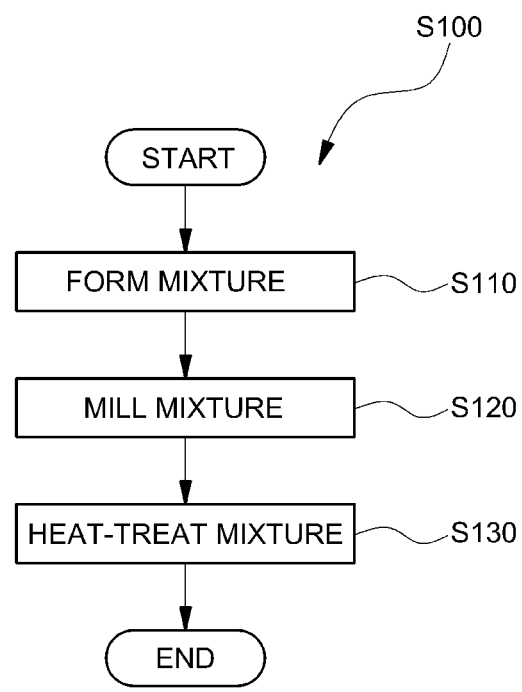
FIG. 2B is a flowchart schematically illustrating a process of providing a sulfide-based solid electrolyte included in the fabrication method of the electrode for the all solid cell according to the embodiment of the present disclosure.

FIG. 2B is a flowchart schematically illustrating a process of providing a sulfide-based solid electrolyte included in the fabrication method of the electrode for the all solid cell according to the embodiment of the present disclosure.

Referring to FIG. 2B, the providing of the sulfide-based solid electrolyte (S100) may include forming a mixture by mixing $Li_2S$ and $P_2S_5$ at a molar ratio of 2:1 to 4:1 (S110), milling the mixture at 500 to 700 rpm for 22 to 26 hours (S120), and heat-treating the milled mixture at 300 to 500° C. for 2 to 4 hours (S130).

First, the mixture is formed by mixing $Li_2S$ and $P_2S_5$ at a molar ratio of 2:1 to 4:1 (S110). When the molar ratio is less than 2:1, the capacity of the all solid cell may be smaller because of a small amount of lithium, and when the molar ratio is more than 4:1, the sulfide-based solid electrolyte is not formed due to a small amount of $P_2S_5$ and the amount of remaining $Li_2S$ may increase.

In the forming of the mixture (S110), the mixture may be formed by further providing LiCl.

The mixture is milled at 500 to 700 rpm for 22 to 26 hours (S120). When the mixture is milled below the range, $Li_2S$ and $P_2S_5$ are sufficiently mixed, but are not milled, and when the mixture is milled above the range, a defect may occur in each of $Li_2S$ and $P_2S_5$.

The milled mixture is heat-treated at 300 to 500° C. for 2 to 4 hours (S130). When the heat treatment time is less than the range, the mixture is not sufficiently heat-treated and the sulfide-based solid electrolyte may not be sufficiently obtained, and when the heat treatment time is more than the range, there is a problem in durability of the obtained sulfide-based solid electrolyte.

FIGS. 3A to 3F are schematic cross-sectional views sequentially illustrating the fabrication method of the electrode for the all solid cell according to the embodiment of the present disclosure.

Figure 3A:
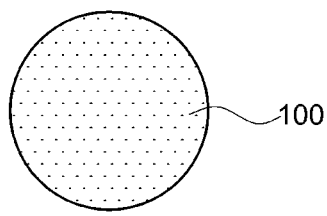
FIGS. 3A to 3F are schematic cross-sectional views sequentially illustrating the fabrication method of the electrode for the all solid cell according to the embodiment of the present disclosure.

Referring to FIGS. 2A and 3A, the sulfide-based solid electrolyte 100 is provided (S100). The sulfide-based solid electrolyte 100 may be obtained by mixing, milling, and heat-treating $Li_2S$ and $P_2S_5$ as described above.

The sulfide-based solid electrolyte 100 includes Li and S. The sulfide-based solid electrolyte 100 may further include at least one of B, P, Si, Ge, and Cl.

Figure 3B:
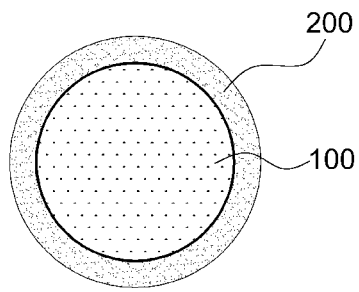

Referring to FIGS. 2A and 3B, the coating layer 200 is formed on the surface of the sulfide-based solid electrolyte 100 by heating the nonmetallic oxide at 300 to 700° C. (S200). When the nonmetallic oxide is heated at less than 300° C., the nonmetallic oxide is not sublimated, and thus, the coating layer 200 is not sufficiently formed on the surface of the sulfide-based solid electrolyte 100, and when the nonmetallic oxide is heated at more than 700° C., a defect in the sulfide-based solid electrolyte 100 may occur.

Accordingly, the nonmetallic oxide used in the forming of the coating layer 200 (S200) may have a boiling point of 300° C. to 700° C. For example, at least one of $H_3BO_3$ or $P_2O_5$ may be provided as the nonmetallic oxide.

The forming of the coating layer 200 (S200) may be performed in an inert atmosphere. The forming of the coating layer 200 (S200) may be performed in an inert gas atmosphere, such as argon (Ar), nitrogen ($N_2$), helium (He), and neon (Ne).

Figure 3C:
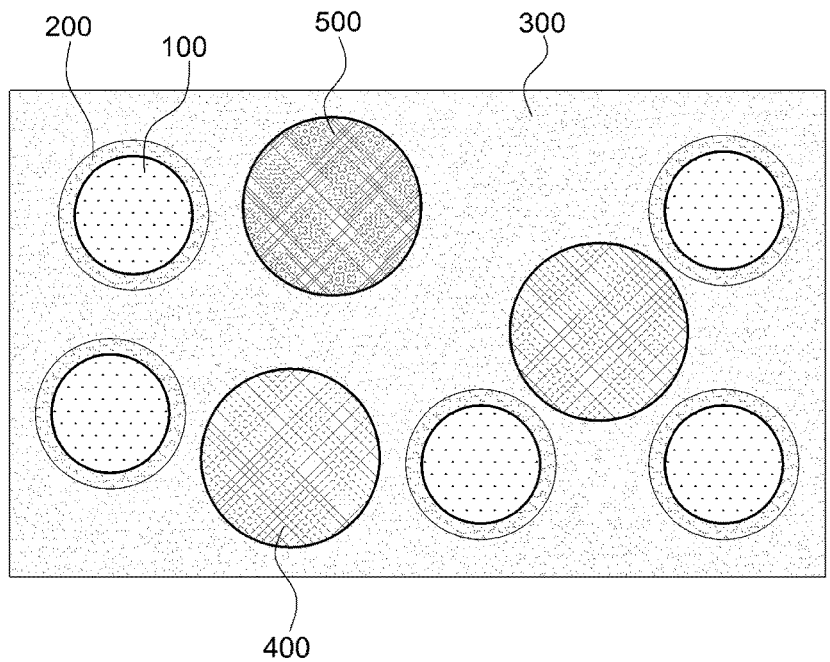

Referring to FIGS. 2A and 3C, the electrode slurry is formed by mixing the electrode active material 300, the sulfide-based solid electrolyte 100 formed with a coating layer 200, and the conductive material 500 with the polar solvent 300 (S300).

In the forming of the electrode slurry (S300), the polar solvent 300 may include at least one of, for example, isopropanol, acetonitrile, and acetone. Organic materials having a dielectric constant of 7 or more may be used as the polar solvent 300, but water ($H_2O$), which is a solvent capable of dissolving the coating layer 200, may not be used.

In the forming of the electrode slurry (S300), the electrode active material 300 may include at least one of, for example, lithium cobalt oxide, lithium iron phosphate, nickel cobalt aluminum, and nickel cobalt manganese.

In the forming of the electrode slurry (S300), the conductive material 500 may include at least one of, for example, graphite, a spherical carbon material (super-P and the like), a needle-like carbon material (vapor grown carbon fiber, VGCF), and carbon nanofiber (CNF).

Figure 3D:
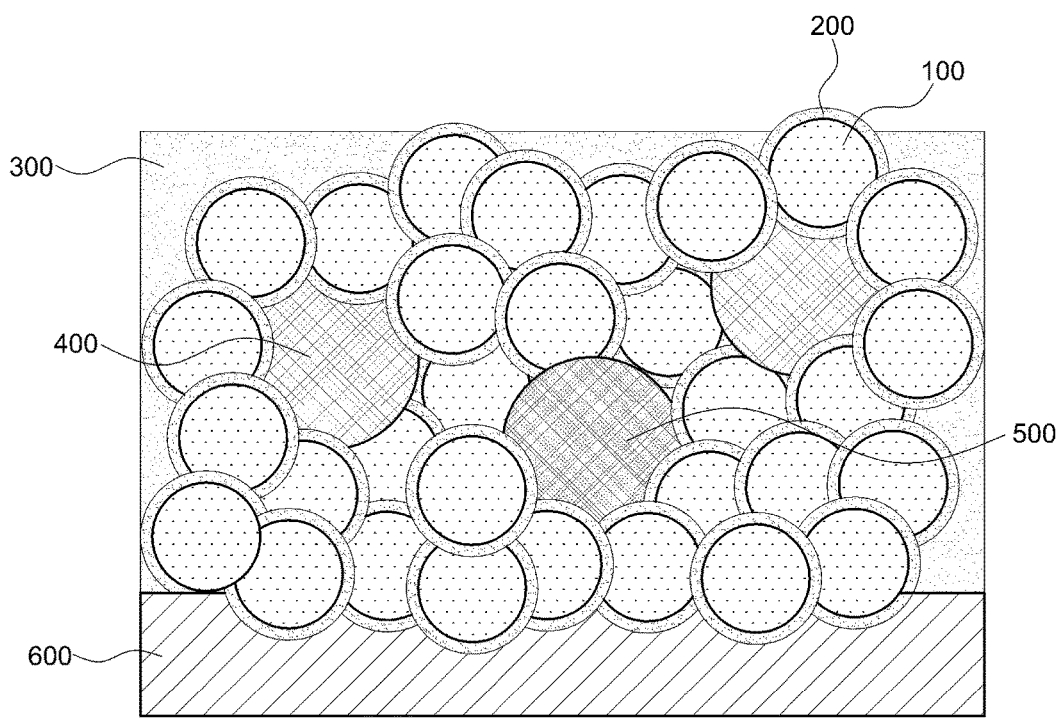

Referring to FIGS. 2A and 3D, the electrode slurry is cast on at least one surface of the electrode current collector 600 (S300). In the casting of the electrode slurry (S300), the electrode current collector 600 may include at least one of, for example, aluminum, nickel, and steel use stainless (SUS).

Figure 3E:
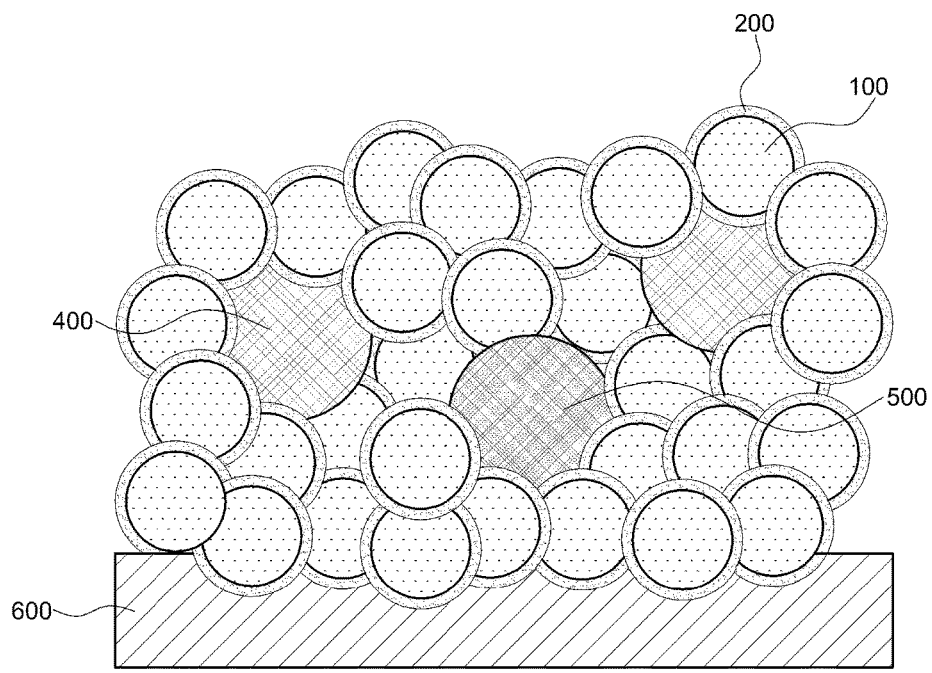

Referring to FIGS. 2A and 3E, the polar solvent 300 is removed by heating the cast electrode slurry at 100 to 300° C. (S500). When the cast electrode slurry is heated at less than 100° C., the organic solvent 300 may not be sufficiently removed, and when the cast electrode slurry is heated at more than 300° C., the coating layer 200 may be vaporized.

Figure 3F:
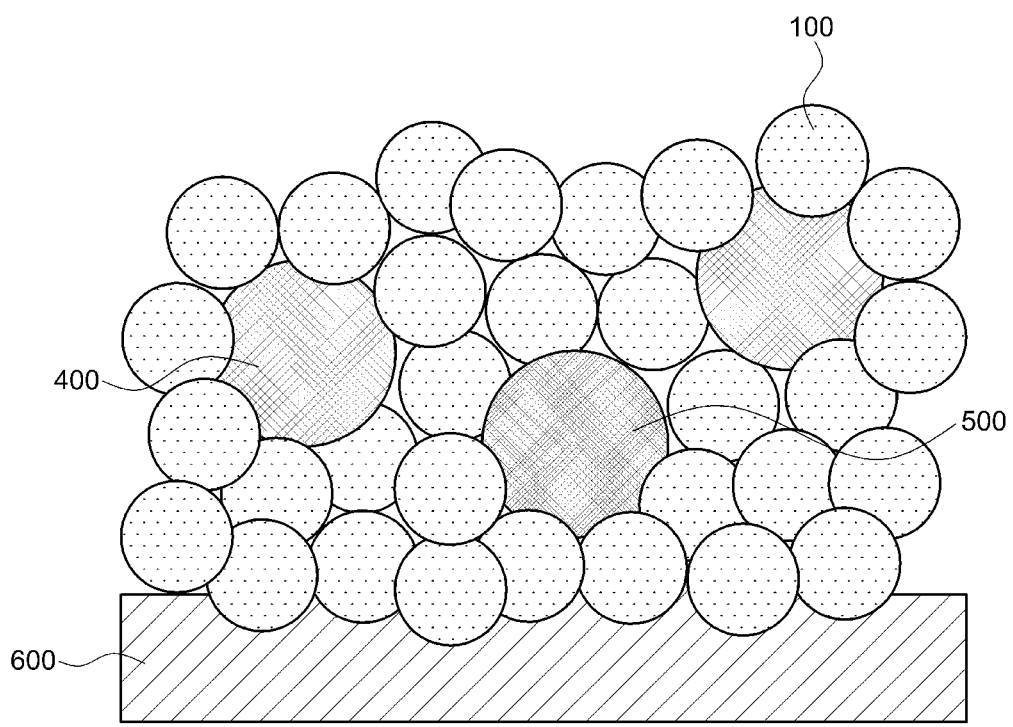

Referring to FIGS. 2A, 3E and 3F, the coating layer 200 is removed by heating the electrode slurry from which the polar solvent 300 is removed at 300 to 700° C. (S600). When the coating layer 200 is removed by heating the electrode slurry at less than 300° C., the coating layer 200 may not be sufficiently removed, and when the coating layer 200 is removed by heating the electrode slurry at more than 700° C., a defect in the sulfide-based solid electrolyte 100 may occur.

In the removing of the coating layer 200 (S600), an unreacted reactant when the sulfide-based solid electrolyte 100 is provided and an unreacted reactant when the coating layer 200 is formed may be removed together. Accordingly, the crystallinity of the sulfide-based solid electrolyte 100 and the amount of the sulfide-based solid electrolyte 100 included in the electrode may be increased.

In a conventional fabrication method of an electrode for an all solid cell, when the electrode slurry including the sulfide-based solid electrolyte is fabricated, only a non-polar solvent which is not reactive with the solid electrolytes is used. However, the non-polar solvent has a problem in that the dispersibility for dispersing the sulfide-based solid electrolyte, the conductive material, the electrode active material, and the like is deteriorated and the stability of the electrode slurry itself is deteriorated.

When an organic solvent is used, there is a problem in that the sulfide-based solid electrolyte reacts with the organic solvent when heating for drying the organic solvent is performed.

The sulfide-based solid electrolyte has a limited working environment due to strong water-reactivity, and when a surface of the sulfide-based solid electrolyte is coated, there is a problem in that the ion conductivity of the coating layer is significantly lower than that of the sulfide-based solid electrolyte, and the ion conductivity of the coated sulfide-based solid electrolyte is largely deteriorated. Further, when the coating layer is formed on the surface of the sulfide-based solid electrolyte, there is a problem in that deterioration of the solid electrolyte occurs when the formed coating layer is used as an electrode.

In the fabrication method of the electrode for the all solid cell according to the embodiment of the present disclosure, the coating layer may be removed only by heating, thereby simplifying the process and maintaining characteristics such as ion conductivity of the sulfide-based solid electrolyte itself and the like. Further, it is possible to secure stability of electrode slurry itself by using a polar solvent having high dispersibility.

Hereinafter, the present disclosure will be described in more detail through detailed Examples. The following Examples are just exemplified for helping in understanding the present disclosure and the scope of the present disclosure is not limited thereto.

EXAMPLES

The following examples illustrate the disclosure and are not intended to limit the same.

Examples 1 to 6

Synthesis of Sulfide-Based Solid Electrolyte

A solid electrolyte raw material having a molar ratio of $Li_2S$ and $P_2S_5$ of 3:1 was prepared. The solid electrolyte raw material was milled using a planetary ball mill (P7, Fritch) at 600 rpm for 24 hours and then heat-treated at 300° C. for 3 hours to obtain a sulfide-based solid electrolyte.

Fabrication of Electrode for All Solid Cell

Nonmetallic oxides illustrated in Table 1 below were prepared and heated at 300° C. under an argon atmosphere to form a coating layer on a surface of the sulfide-based solid electrolyte. A coated solid electrolyte, a lithium cobalt oxide ($LiCoO_2$), and a conductive material (Super-P) were added into a polar solvent illustrated in Table 1 below at a wt % ratio of 28:70:2 and cast in an electrode current collector made of aluminum foil. The polar solvent was removed by heating the mixture at 150° C. The coating layer was removed by heating the mixture at a temperature illustrated in Table 1 below. The mixture was used as the cathode, $Li_6PS_5Cl$ was used as the solid electrolyte layer, and indium was used as the anode to fabricate the all solid cell.

Comparative Examples 1 to 8

In Comparative Examples 1 and 2, the coating layer was not removed, in Comparative Examples 3 and 4, the non-polar solvent was used, in Comparative Examples 5 and 6, the coating layer was not formed, and in Comparative Examples 7 and 8, the coating layer was formed of carbon. In addition, Comparative Examples 1 to 8 were performed in the same manner as Examples 1 to 8.

TABLE 1

| | Coating layer | Mixed solvent | Heat treatment temperature (° C.) | Initial discharge capacity (mAh/g) |
|---|---|---|---|---|
| Example 1 | $P_2O_5$ | Isopropanol (IPA) | 300 | 120.95 |
| Example 2 | $P_2O_5$ | IPA | 400 | 146.25 |
| Example 3 | $P_2O_5$ | IPA | 500 | 144.23 |
| Example 4 | $P_2O_5$ | IPA | 600 | 142.76 |
| Example 5 | $P_2O_5$ | IPA | 700 | 124.85 |
| Example 6 | $H_3BO_3$ | IPA | 400 | 124.54 |
| Comparative Example 1 | $P_2O_5$ | IPA | X | 114.56 |
| Comparative Example 2 | $H_3BO_3$ | IPA | X | 90.22 |
| Comparative Example 3 | X | Xylene | X | 60.28 |
| Comparative Example 4 | X | Xylene | 400 | 38.87 |
| Comparative Example 5 | X | IPA | X | — |
| Comparative Example 6 | X | IPA | 400 | 13.89 |
| Comparative Example 7 | Carbon | IPA | X | — |
| Comparative Example 8 | Carbon | IPA | 400 | — |

Evaluation of Properties

1. When comparing Examples 1 to 5 and Comparative Example 1, it can be seen that Examples 1 to 5, in which the coating layer is removed, have higher initial discharge capacities than that of Comparative Example 1.

2. When comparing Example 6 and Comparative Example 2, it can be seen that Example 6 in which the coating layer was removed has a higher initial discharge capacity than that of Comparative Example 1.

3. Referring to Examples 1 to 6 and Comparative Examples 3 to 8, it can be seen that the initial discharge capacities of Examples 1 to 6 are higher than those of Comparative Examples 3 to 6 in which the coating layer is not formed and Comparative Examples 7 and 8 in which the coating layer is formed of carbon.

Figure 4A:
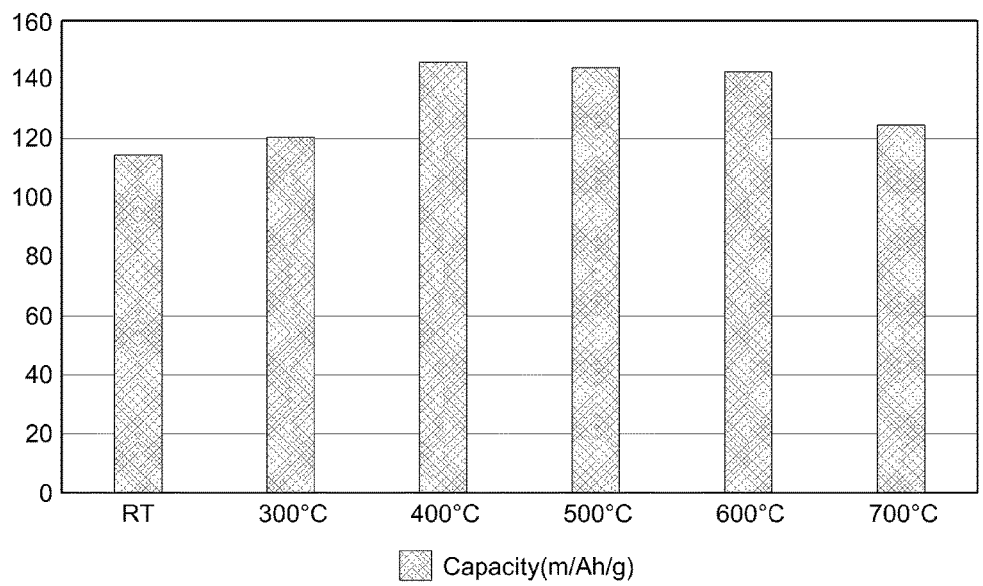
FIG. 4A is a graph illustrating capacity values according to a temperature at which a coating layer is removed.

4. Referring to FIG. 4A, it can be seen that when the coating layer is removed at 300 to 700° C. (each of Examples 1 to 5) higher than a reference temperature (200° C.), the capacity is high.

Figure 4B:
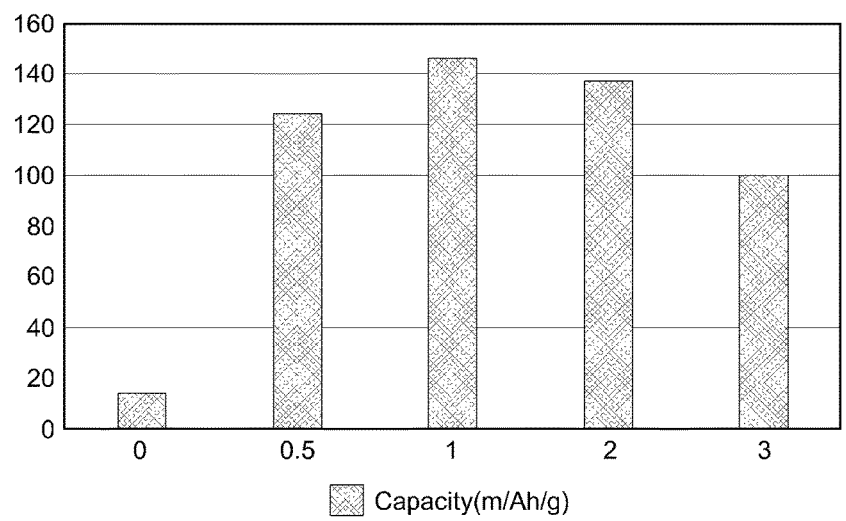
FIG. 4B is a graph illustrating capacity values according to a coating amount of the coating layer.

5. Referring to FIG. 4B, it can be seen that when a coating amount of $P_2O_5$ (a coating amount (wt %) of $P_2O_5$ when lithium cobalt oxide ($LiCoO_2$) as a cathode active material is 100 wt %) is 0.5 wt % to 3 wt % and preferably 0.5 wt % to 2 wt %, the capacity is high.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A fabrication method of an electrode for an all solid cell, comprising:
    providing a sulfide-based solid electrolyte;
    forming a coating layer on a surface of the sulfide-based solid electrolyte by heating a nonmetallic oxide at 300 to 700° C.;
    forming electrode slurry by mixing an electrode active material, the sulfide-based solid electrolyte formed with the coating layer, and a conductive material with a polar solvent;
    casting the electrode slurry on at least one surface of an electrode current collector;
    removing the polar solvent by heating the cast electrode slurry at 100 to 300° C.; and
    removing the coating layer by heating the electrode slurry from which the polar solvent is removed at 300 to 700° C.

2. The fabrication method of claim 1, wherein in the forming of the coating layer, the nonmetallic oxide has a boiling point of 300° C. to 700° C.

3. The fabrication method of claim 1, wherein in the forming of the coating layer, at least one of $H_3BO_3$ or $P_2O_5$ is provided as the nonmetallic oxide.

4. The fabrication method of claim 1, wherein the forming of the coating layer is performed in an inert gas atmosphere.

5. The fabrication method of claim 1, wherein in the forming of the electrode slurry, the polar solvent includes at least one of isopropanol, acetonitrile, and acetone.

6. The fabrication method of claim 1, wherein in the forming of the electrode slurry, the electrode active material includes at least one of lithium cobalt oxide, lithium iron phosphate, nickel cobalt aluminum, and nickel cobalt manganese.

7. The fabrication method of claim 1, wherein in the forming of the electrode slurry, the conductive material includes at least one of graphite, a spherical carbon material, and a needle-like carbon material.

8. The fabrication method of claim 1, wherein in the casting of the electrode slurry, the electrode current collector includes at least one of aluminum, nickel, and steel use stainless.

* * * * *